United States Patent
K Sebastian et al.

(10) Patent No.: US 10,103,969 B2
(45) Date of Patent: Oct. 16, 2018

(54) OPEN SHORTEST PATH FIRST ROUTING FOR HYBRID NETWORKS

(71) Applicant: HEWLETT-PACKARD DEVELOPMENT COMPANY, L.P., Houston, TX (US)

(72) Inventors: Celestian K Sebastian, Bangalore (IN); Anil Raj, Bangalore (IN); Haris Palapra, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 162 days.

(21) Appl. No.: 15/198,097

(22) Filed: Jun. 30, 2016

(65) Prior Publication Data

US 2017/0005910 A1    Jan. 5, 2017

(30) Foreign Application Priority Data

Jun. 30, 2015 (IN) .......................... 3342/CHE/2015

(51) Int. Cl.
  *H04L 12/721* (2013.01)
  *H04L 12/24* (2006.01)
  *H04L 12/64* (2006.01)
  *H04L 12/46* (2006.01)

(52) U.S. Cl.
  CPC .......... *H04L 45/12* (2013.01); *H04L 12/4633* (2013.01); *H04L 12/64* (2013.01); *H04L 41/12* (2013.01); *H04L 45/38* (2013.01)

(58) Field of Classification Search
  CPC ...................................................... H04L 12/64
  See application file for complete search history.

(56) References Cited

U.S. PATENT DOCUMENTS

| 2013/0266007 | A1 | 10/2013 | Kumbhare et al. | |
| 2013/0329548 | A1 | 12/2013 | Nakil et al. | |
| 2015/0103671 | A1 | 4/2015 | Ernstrom et al. | |
| 2015/0244607 | A1* | 8/2015 | Han ........................ | H04L 45/02 370/254 |
| 2016/0036644 | A1* | 2/2016 | Devarajan ............. | H04L 12/462 370/254 |

OTHER PUBLICATIONS

"OSPF Implementation in RYU Controller," Sep. 1, 2014, 1-page, <groups.google.com/forum/#!topic/geniusers>.
"Routeflow," 2015, pp. 1-4, CPqD.
Gautam Khetrapal and Saurabh Kumar Sharma, "Demystifying Routing Services in Softwar-defined Networking," Aug. 30, 2013, pp. 1-12, Aricent Group.

* cited by examiner

*Primary Examiner* — Zhiren Qin
(74) *Attorney, Agent, or Firm* — Hewlett Packard Enterprise Patent Department

(57) ABSTRACT

In some examples, a method includes determining, with a Software-Defined Networking (SDN) controller, a network topology for an SDN portion of a heterogeneous network. SDN portion 111 can, for example, be formed by hybrid and SDN devices. The heterogeneous network can, for example, include a non-SDN portion that borders SDN portion 111 and is formed by non-SDN devices. The method can further include sending tunneling instructions to a first hybrid border switch to create a tunnel between the first hybrid border switch and a second hybrid border switch in order to allow Open Shortest Path First (OSPF) routing between two non-SDN portions separated by an SDN portion within the heterogeneous network.

15 Claims, 7 Drawing Sheets

OPEN SHORTEST PATH FIRST ROUTING FOR HYBRID NETWORKS

BACKGROUND

Computer networks can be used to allow networked devices, such as personal computers, servers, and data storage devices to exchange data. Computer networks often include intermediary datapath devices such as network switches, gateways, and routers, to flow traffic along selected datapaths for routing data between networked devices. Such datapaths can, for example, be selected by a network controller, administrator, or another entity, and can, for example, be based on network conditions, network equipment capabilities, or other factors.

DETAILED DESCRIPTION

Figure 1:
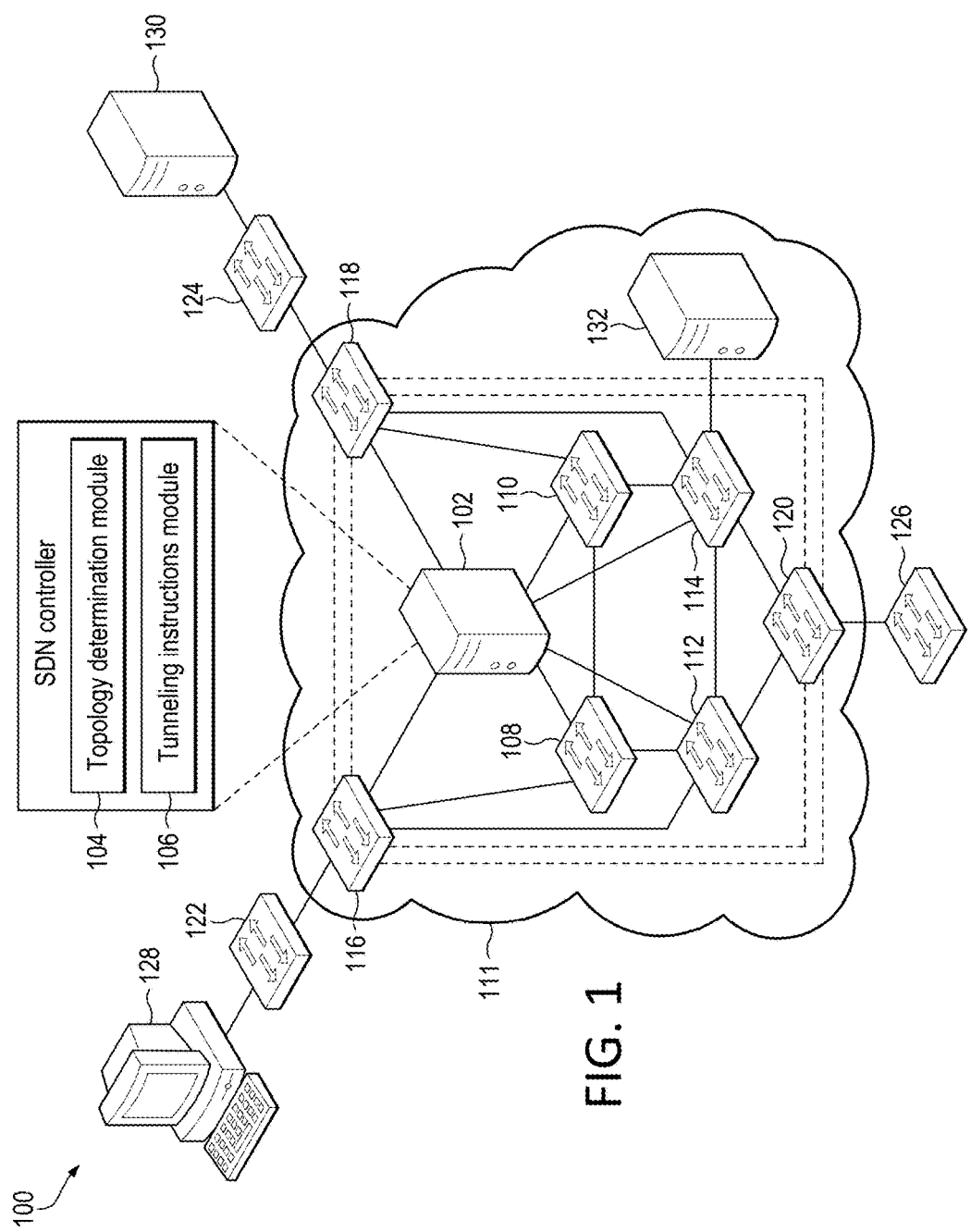
FIG. 1 is a diagram of a network, according to an example.

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

Software-defined networks/networking (SDN) can allow for the decoupling of traffic routing control decisions from the network's physical infrastructure. For example, in an SDN, such traffic routing control decisions (e.g., which port of a network switch should be used to forward traffic en route to a given destination) can be determined by an entity (e.g., a network controller) that is different from the routing device itself (e.g., the network switch tasked with forwarding the traffic). A network controller used to implement an SDN (i.e., an SDN controller) can, for example, be programmed to: (1) receive dynamic parameters of the network from intermediary datapath devices (e.g., network switches), (2) decide how to route packets over the network, and (3) inform the devices about these decisions.

The OSPF (Open Shortest Path First) protocol is a common Internal Gateway Protocol (IGP) that can provide robust and efficient routing support in demanding Internet environments. Certain link-state routing protocols, such as OSPF, can face difficulties when traversing between a "legacy" or non-SDN portion of the heterogeneous network (e.g., an area of the network that includes only legacy switches or other non-SDN capable devices) into an SDN portion of the network. For example, OSPF is well-suited to run on large routing domains, and the transition between non-SDN and SDN networks may break up the routing domain and can cause network connectivity issues.

Certain implementations of the present disclosure can be used to extend an OSPF routing domain across multiple SDN network portions in a heterogeneous network. One implementation of the present disclosure is directed to an SDN controller programmed to determine a network topology for an SDN portion of a heterogeneous network and to send tunneling instructions to a first hybrid border switch to create a tunnel between the first hybrid border switch and a second hybrid border switch in order to allow Open Shortest Path First (OSPF) routing between two non-SDN portions separated by an SDN portion within the heterogeneous network.

Certain implementations of the present disclosure can be used to improve various network applications, such as: (1) extending routing domains beyond SDN network portions in heterogeneous networks, (2) providing better manageability and flexibility because routing networks can be designed easily without concerns about the network types involved (i.e., SDN or legacy), (3) implementations can be extended across different networks and the entire network can be visualized (or virtualized) as a single network, and (4) virtual routing domains can be designed involving SDN and non-SDN network types. Other advantages of implementations presented herein will be apparent upon review of the description and figures.

FIG. 1 is a diagram of an example heterogeneous network 100 including an example Software-Defined Networking (SDN) controller 102 including various combined hardware and software modules 104 and 106 as well as various SDN switches 108, 110, 112, and 114, various hybrid (SDN- and legacy-capable) switches 116, 118, and 120, and various legacy-only switches 122, 124, and 126. The term "heterogeneous network" as used herein can, for example, refer to a network where both traditional networking as well as SDN protocols operate in the same environment. Such a heterogeneous network can, for example, include one or more traditional portions, which rely on legacy devices, and one or more SDN portions 111, which rely on hybrid and/or SDN devices. In such a network a network manager can, for example, configure the SDN control plane to discover and control certain traffic flows while traditional, distributed networking protocols to direct the rest of the traffic on the network.

In some implementations, heterogeneous network 100 includes various hardware switches or other routing devices that are connected using physical cabling or other physical data channels. In some implementations, heterogeneous network 100 is a virtualized heterogeneous network. Such a virtualized heterogeneous network can, for example, overlay physical hardware of a network including multiple computing devices or just a single computing device. The structure and functionality of the various modules of SDN controller 102 are described in detail herein. FIG. 1 further illustrates various source and destination nodes 128, 130, and 132. For purposes of consistency, node 128 will be referred to herein as a source node, and nodes 130 and 132 will be referred to as destination nodes. It is appreciated that in some implementations, node 128 can serve as a destination node and nodes 130 and/or 132 can serve as source nodes. It is further appreciated that certain nodes may serve as a source node for a period of time (e.g., while sending data) and then switch into a receiving node for a period of time (e.g., while receiving data). The use of the terms "source" and "destination" are merely intended to refer to a flow of traffic at a given time.

As provided above, network nodes within heterogeneous network 100 can forward traffic along the datapath based on metadata within the traffic. For example, traffic in the form of a packet can be received at network switch 116 (or another suitable intermediary network node). For consistency, the industry term "packet" is used throughout this description, however, it is appreciated that the term "packet" as used herein can refer to any suitable protocol data unit (PDU). Such a packet can, for example, include payload data as well as metadata in the form of control data. Control data can, for example, provide data to assist the network node with reliably delivering the payload data. For example, control data can include network addresses for source node 128 and destination node 130, error detection codes, sequencing information, packet size of the packet, a time-to-live (TTL) value, etc. In contrast, payload data can include data carried on behalf of an application for use by nodes (e.g., source node 128 and destination node 130).

As provided above, in an SDN (such as for example heterogeneous network 100), control decisions for routing traffic through the network can be decoupled from the network's physical infrastructure. For example, SDN controller 102 can be used to instruct network nodes to flow traffic along a selected routing path defined by the nodes. It is appreciated that the routing path can be determined by SDN controller 102 based on one or more static parameters, such as link speeds and number hops between the nodes and can further (or alternatively) be based on one or more dynamic parameters, such as Quality of Service (QoS), network latency, network throughput, network power consumption, etc.

In some implementations, these nodes can, for example, be in the form of network switches or other intermediary network devices. The use of such software-defined networking can provide other functionality. For example, one or more applications can be installed on or interface with SDN controller 102 to meet customer use cases, such as to achieve a desired throughput (or another QoS) over heterogeneous network 100, enforce security provisions for heterogeneous network 100, or provide another suitable service or functionality.

The functionality of SDN controller 102 can, for example, be implemented in part via a software program on a standalone machine, such as a standalone server. In some implementations, SDN controller 102 can be implemented on multi-purpose machines, such as a suitable desktop computer, laptop, tablet, or the like. In some implementations, SDN controller 102 can be implemented on a suitable non-host network node, such as certain types of network switches. It is appreciated that the functionality of SDN controller 102 may be split among multiple controllers or other devices. For example, heterogeneous network 100 is described and illustrated as including only one SDN controller 102. However, it is appreciated that the disclosure herein can be implemented in SDNs with multiple controllers. For example, in some SDNs, network devices are in communication with multiple controllers such that control of the network can be smoothly handed over from a first controller to a second controller if a first controller fails or is otherwise out of operation. As another example, multiple controllers can work together to concurrently control certain SDNs. In such SDNs, a first controller can, for example, control certain network devices while a second controller can control other network devices. In view of the above, reference in this application to a single SDN controller 102 that controls the operation of heterogeneous network 100 is intended to include such multiple controller configurations (and other suitable multiple controller configurations).

Source node 128 and destination nodes 130 and 132 can, for example, be in the form of network hosts or other types of network nodes. For example, one or all of source node 128 and destination nodes 130 and 132 can be in the form of suitable servers, desktop computers, laptops, printers, etc. As but one example, source node 128 can be in the form of a desktop computer including a monitor for presenting information to an operator and a keyboard and mouse for receiving input from an operator, and destination nodes 130 and 132 can be in the form of respective standalone storage server appliances. It is further appreciated that source node 128 and destination nodes 130 and 132 can be endpoint nodes on heterogeneous network 100, intermediate nodes between endpoint nodes, or positioned at other logical or physical locations within heterogeneous network 100.

The various intermediary nodes within heterogeneous network 100 can, for example, be in the form of switches or other multi-port network bridges that process and forward data at the data link layer. In some implementations, one or more of the nodes can be in the form of multilayer switches that operate at multiple layers of the Open Systems Connection (OSI) model (e.g., the data link and network layers). Although the term "switch" is used throughout this description, it is appreciated that this term can refer broadly to other suitable network data forwarding devices. For example, the term "switch" can include other network datapath elements in the form of suitable routers, gateways and other devices that provide switch-like functionality for heterogeneous network 100. As another example, a general purpose computer can include suitable hardware and machine-readable instructions that allow the computer to function as a network switch.

In some implementations, an SDN-capable switch (e.g., SDN switches 108, 110, 112, 114, and/or hybrid border switches 116, 118, and 120) in heterogeneous network 100 can rely on flow rules stored on the switch (or otherwise accessible by the switch) for forwarding or otherwise handling traffic. Flow rules can, for example, contain information such as: (1) match fields to match against packets (e.g., an ingress port and specific packet header fields), (2) a priority value for the flow rule to allow prioritization over other flow entries, (3) counters that are updated when packets are matched, (4) instructions to modify the action set or pipeline processing, (5) timeouts indicating a maximum amount of time or idle time before a flow is expired by the switch, and (6) a cookie value which can be used by the SDN controller to filter flow statistics, flow modification, and flow deletion.

The various nodes within heterogeneous network 100 are connected via one or more data channels, which can, for example be in the form of data cables or wireless data channels. Although a single link (i.e., a single line in FIG. 1) between each network node is illustrated, it is appreciated that each single link may include multiple wires or other wired or wireless data channels. Moreover, FIG. 1 further depicts SDN controller 102 as being connected to each network nodes via broken lines, which is intended to illustrate control channels between SDN controller 102 and respective nodes. However, it is appreciated that SDN controller 102 may be directly connected to only one or a few network nodes, while being indirectly connected to other nodes of heterogeneous network 100. As but one example, SDN controller 102 can be directly connected to node 108 via an Ethernet cable, while being indirectly connected to node 112 (e.g., by relying on node 108 as an intermediary for communication with node 112).

Within the context of an SDN, controlled network nodes can be used as sensors in the network as they have information about dynamic network parameters. When polled via standard SDN interfaces the devices can report this information to SDN controller 102. Heterogeneous network 100 can, for example, be implemented through the use of SDN controller 102 that interfaces with various SDN-compatible devices via a suitable Application Program Interface ("API"), or another suitable protocol (e.g., OpenFlow). In some implementations, SDN controller 102 may interface with controlled network devices via an interface channel that connects each controlled device to SDN controller 102 to allow SDN controller 102 to configure and manage each device, receive events from each device, and send packets using each device.

In the example heterogeneous network 100 depicted in FIG. 1, the various network nodes are in the form of intermediary nodes (e.g., controlled network switch 108) and host devices (e.g., source node 128 and destination nodes 130 and 132). It is appreciated however, that the implementations described herein can be used or adapted for networks including more or fewer devices, different types of devices, and different network arrangements.

Figure 2:
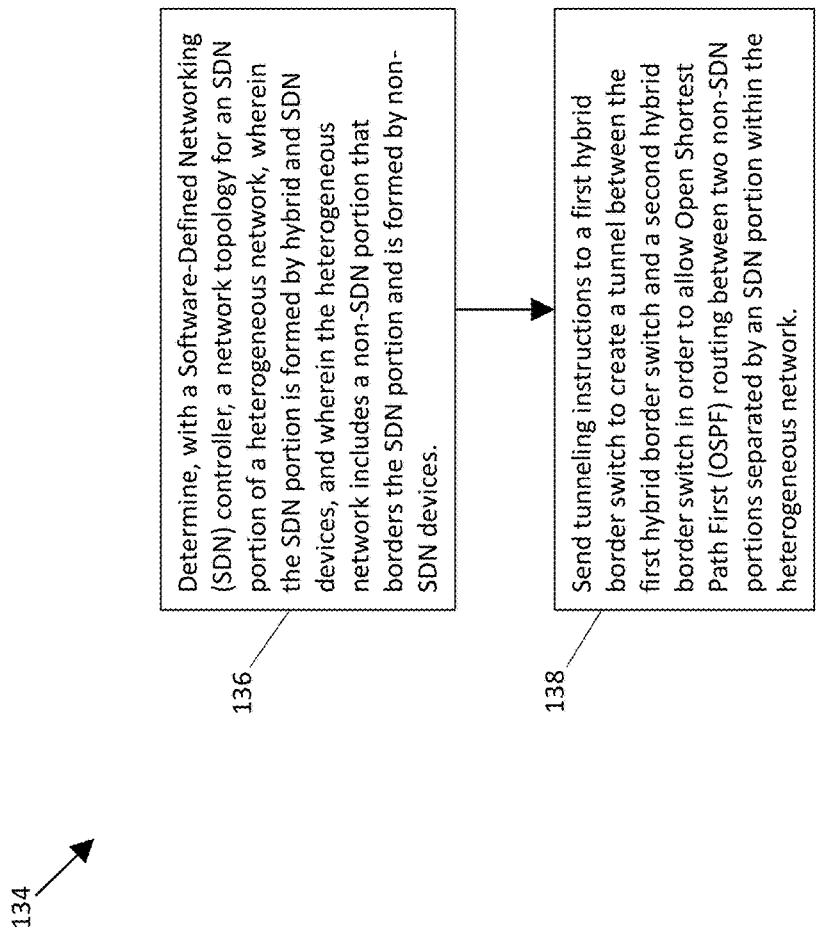
FIG. 2 is a flowchart for a method, according to an example.

FIG. 2 illustrates a flowchart for a method 134 according to an example of the present disclosure. For illustration, the description of method 134 and its component steps make reference to example heterogeneous network 100 and elements thereof, such as for example SDN controller 102, however, it is appreciated that method 134 or aspects thereof can be used or otherwise applicable for any suitable network or network element described herein or otherwise. For example, method 134 can be applied to computer networks with different network topologies than those illustrated in FIG. 1.

In some implementations, method 134 can be implemented in the form of executable instructions stored on a memory resource (e.g., the memory resource of FIG. 6), executable machine readable instructions stored on a storage medium (e.g., the medium of FIG. 7), in the form of electronic circuitry (e.g., on an Application-Specific Integrated Circuit (ASIC)), and/or another suitable form. Although the description of method 134 herein primarily refers to steps performed on SDN controller 102 for purposes of illustration, it is appreciated that in some implementations, method 134 can be executed on another computing device within heterogeneous network 100 or in data communication with SDN controller 102.

Method 134 includes determining (at block 136), with SDN controller 102, a network topology for SDN portion 111 of heterogeneous network 100. SDN portion 111 can, for example, be formed by hybrid and SDN devices. Heterogeneous network 100 can further include a non-SDN portion that borders SDN portion 111 and can, for example, be formed by non-SDN devices. In the heterogeneous network 100 of FIG. 1, switches 116, 118, and 120 serve as border switches between SDN portion 111 of heterogeneous network 100 and the non-SDN portion of heterogeneous network 100. In the heterogeneous network 100 of FIG. 1, SDN portion 111 includes switches 116, 118, 120, 108, 110, 112, and 114, as well as destination node 132 and SDN controller 102. The non-SDN portion of heterogeneous network 100 includes switches 122, 124, and 126 as well as source node 128 and destination node 130. Although only a single SDN portion is depicted in FIG. 1, in some implementations, heterogeneous network 100 can include multiple SDN portions.

In some implementations, the switches 116, 118, 120, 108, 110, 112, and 114 are within the control domain of SDN controller 102. As used herein, the term "controlled" and similar terminology in the context of SDN-compatible network nodes, such as "controlled switches," is intended to include devices within the control domain of SDN controller 102 or otherwise similarly controllable by SDN controller 102. Such a controlled node can, for example, communicate with SDN controller 102 and SDN controller 102 is able to manage the node in accordance with an SDN protocol, such as the OpenFlow protocol. For example, an OpenFlow-compatible switch controlled by SDN controller 102 can permit SDN controller 102 to add, update, and delete flow entries in flow tables of the switch using suitable SDN commands.

In some implementations, the network topology is determined based on Bi-directional Forwarding Detection (BFD) connectivity information received from SDN devices in heterogeneous network 100. In some such implementations, each device in SDN portion 111 of heterogeneous network 100 runs BFD to each of its connected devices and passes the connectivity information to SDN controller 102. SDN controller 102 can then identify the network topology using this information.

Method 134 includes sending (at block 138) tunneling instructions to a first hybrid border switch (e.g., switch 116) to create a tunnel between the first hybrid border switch and a second hybrid border switch in order to allow Open Shortest Path First (OSPF) routing between two non-SDN portions separated by an SDN portion within the heterogeneous network. The two non-SDN portions can, for example, be separated by an SDN portion because SDN portion 111 communicatively bridges the two non-SDN portions. In some implementations, the SDN controller sends tunneling instructions to every hybrid border switch in SDN portion 111 to create tunnels between each of the hybrid border switches (e.g., between switch 116 and switch 118, between switch 116 and switch 120, and between switch 118 and switch 120) in order to allow OSPF routing between any two hybrid border switches.

In some implementations, SDN controller 102 is to install tunnels between border switches (e.g., 116, 118, and 120) so that OSPF connectivity is maintained between non-SDN devices partitioned by SDN devices. That is, routing between two such non-SDN portions of heterogeneous network 100 can, for example, be achieved through the use of tunnels between border devices. Routing within one area of non-SDN devices can, for example, be based on normal OSPF functionality. Routing within SDN-only portions of heterogeneous network 100 can, for example, be achieved by SDN controller 102 installing respective flow entries to switches within SDN portion 111s. Likewise, routing from SDN devices to non-SDN devices can, for example, pass through one of the border switches based on the OSPF routes learned by that border switch and aided by SDN controller 102 to reach the border switch. Routing from non-SDN devices to SDN devices can, for example, be achieved by the static routes redistributed by the border switch. Once data (e.g., in the form of a packet) reaches the border switch, further forwarding can be handled by SDN controller 102 through flow entries. Border switches for use with the present disclosure can, for example, have some interfaces on SDN portion 111 of heterogeneous network 100 and some interfaces on the non-SDN portion of heterogeneous network 100 but can be otherwise distinct from the "Area Border Router" and "Autonomous System Border Router" defined by OSPF standards.

Although the flowchart of FIG. 2 shows a specific order of performance, it is appreciated that this order may be rearranged into another suitable order, may be executed concurrently or with partial concurrence, or a combination thereof. Likewise, suitable additional and/or comparable steps may be added to method 134 or other methods described herein in order to achieve the same or comparable functionality. In some implementations, one or more steps are omitted. For example, in some implementations, block 138 of sending tunneling instructions can be omitted from method 134 and/or replaced with another function. It is appreciated that blocks corresponding to additional or alternative functionality of other implementations described herein can be incorporated in method 134. For example, blocks corresponding to the functionality of various aspects of SDN controller 102 otherwise described herein can be incorporated in method 134 even if such functionality is not explicitly characterized herein as a block in method 134.

Figure 3:
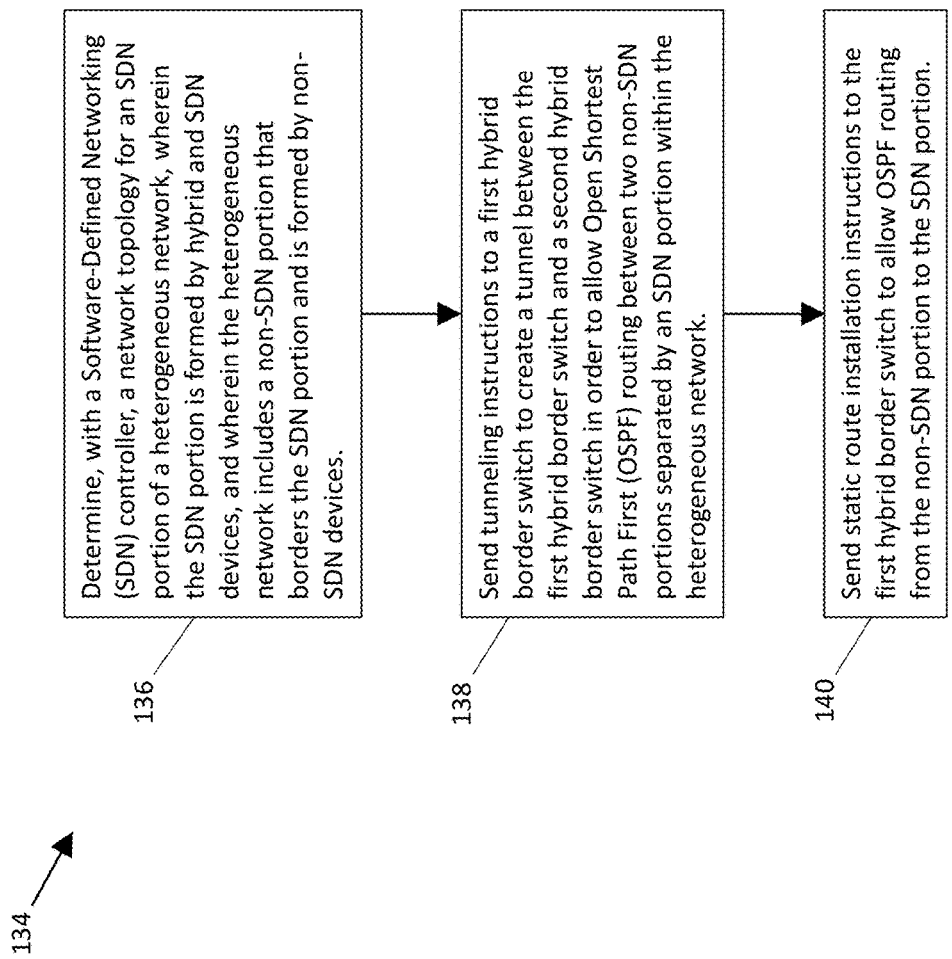
FIG. 3 is a flowchart for a method, according to another example.

FIG. 3 illustrates another example of method 134 in accordance with the present disclosure. For illustration, FIG. 3 reproduces various blocks from method 134 of FIG. 2, however it is appreciated that method 134 of FIG. 3 can include additional, alternative, or fewer steps, functionality, etc., than method 134 of FIG. 2 and is not intended to be limited by the diagram of FIG. 2 (or vice versa) or the related disclosure thereof. It is further appreciated that method 134 of FIG. 2 can incorporate one or more aspects of method 134 of FIG. 3 and vice versa. For example, in some implementations, method 134 of FIG. 2 can include the additional step described below with respect to method 134 of FIG. 3.

Method 134 includes sending (at block 140) static route installation instructions to the first hybrid border switch (e.g., switch 116) to allow OSPF routing from the non-SDN portion to SDN portion 111. In some implementations, the static route installation instructions are to allow devices in the non-SDN portion to reach a subnet within SDN portion 111. Routes learned by border switches from OSPF will be passed to SDN controller 102. SDN controller 102 can, for example, use this information to derive flow entries for handling packet forwarding in the SDN-only portion of heterogeneous network 100.

For example, in some implementations, block 140 includes installing static routes to hybrid border switches of SDN portion 111 of heterogeneous network 100. In some implementations, each device bordering SDN portion 111 of the network is a hybrid device that runs protocols to support both SDN portion 111 and the non-SDN portion of heterogeneous network 100. In some implementations, static routes for reaching each subnet of SDN portion 111 are installed on border switches between a border of SDN portion 111 and the non-SDN portion. These routes can, for example, be redistributed by the border switch to the non-SDN portion of heterogeneous network 100. Non-SDN devices can, for example, run OSPF and can, for example, compute the best paths to the other devices. Devices on the border of SDN portion 111 of the heterogeneous network 100 can, for example, run OSPF on an interface to the non-SDN portion of heterogeneous network 100 and can use the static route installed by SDN controller 102 to route into SDN portion 111 of heterogeneous network 100.

Figure 4:
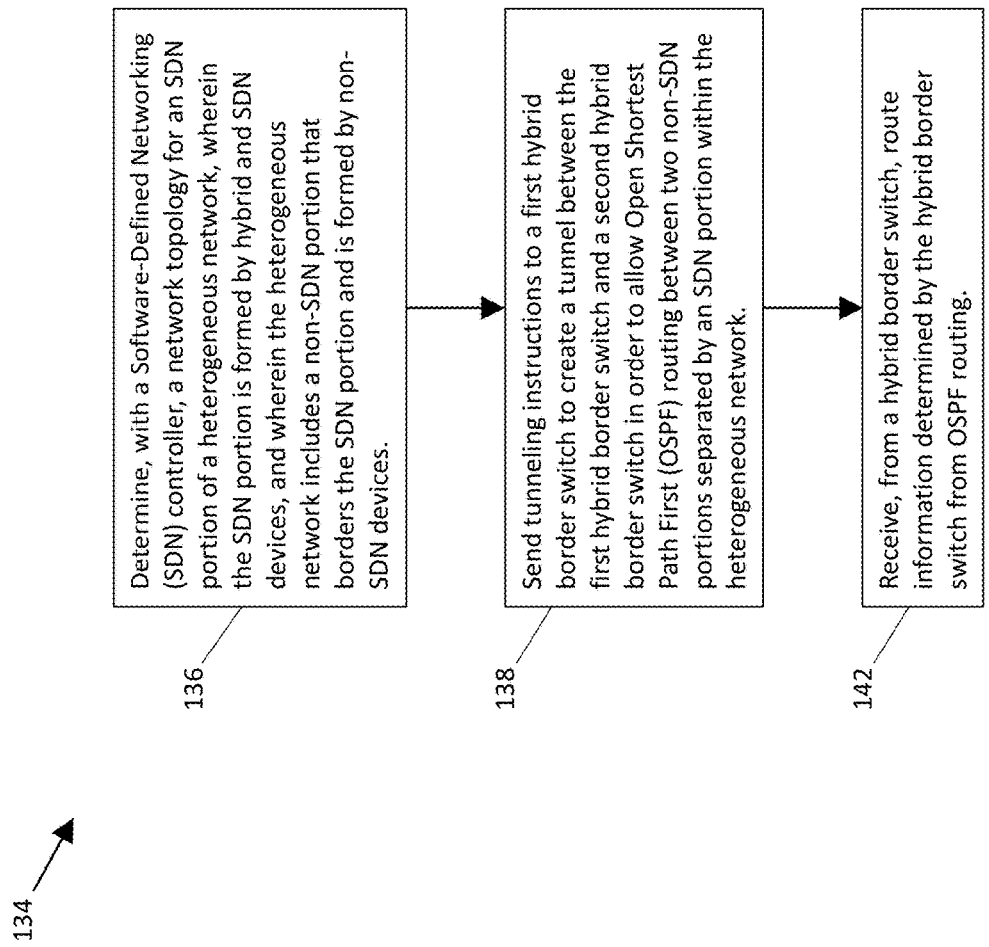
FIG. 4 is a flowchart for a method, according to another example.

FIG. 4 illustrates another example of method 134 in accordance with the present disclosure. For illustration, FIG. 4 reproduces various blocks from method 134 of FIG. 2, however it is appreciated that method 134 of FIG. 4 can include additional, alternative, or fewer steps, functionality, etc., than method 134 of FIG. 2 and is not intended to be limited by the diagram of FIG. 2 (or vice versa) or the related disclosure thereof. It is further appreciated that method 134 of FIG. 2 can incorporate one or more aspects of method 134 of FIG. 4 and vice versa. For example, in some implementations, method 134 of FIG. 2 can include the additional step described below with respect to method 134 of FIG. 4. Method 134 of FIG. 4 includes receiving (at block 142), from a hybrid border switch (e.g., switch 116), route information determined by the hybrid border switch from OSPF routing.

Figure 5:
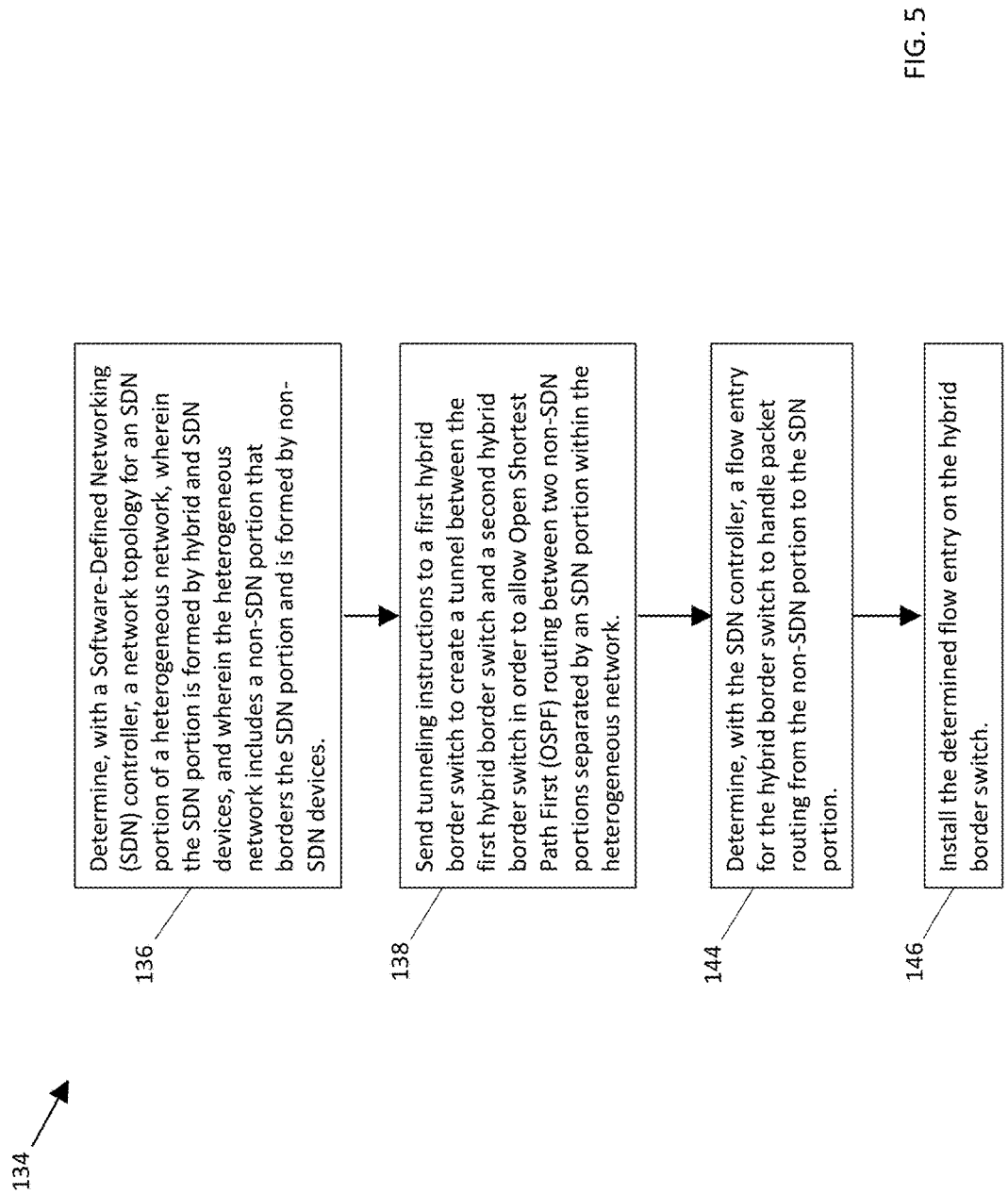
FIG. 5 is a flowchart for a method, according to another example.

FIG. 5 illustrates another example of method 134 in accordance with the present disclosure. For illustration, FIG. 5 reproduces various blocks from method 134 of FIG. 2, however it is appreciated that method 134 of FIG. 5 can include additional, alternative, or fewer steps, functionality, etc., than method 134 of FIG. 2 and is not intended to be limited by the diagram of FIG. 2 (or vice versa) or the related disclosure thereof. It is further appreciated that method 134 of FIG. 2 can incorporate one or more aspects of method 134 of FIG. 5 and vice versa. For example, in some implementations, method 134 of FIG. 2 can include the additional step described below with respect to method 134 of FIG. 5. Method 134 of FIG. 5 includes determining (at block 144), with SDN controller 102, a flow entry for the hybrid border switch to handle packet routing from the non-SDN portion to SDN portion 111. Method 134 of FIG. 5 further includes installing (at block 146) the determined flow entry on the hybrid border switch.

Figure 6:
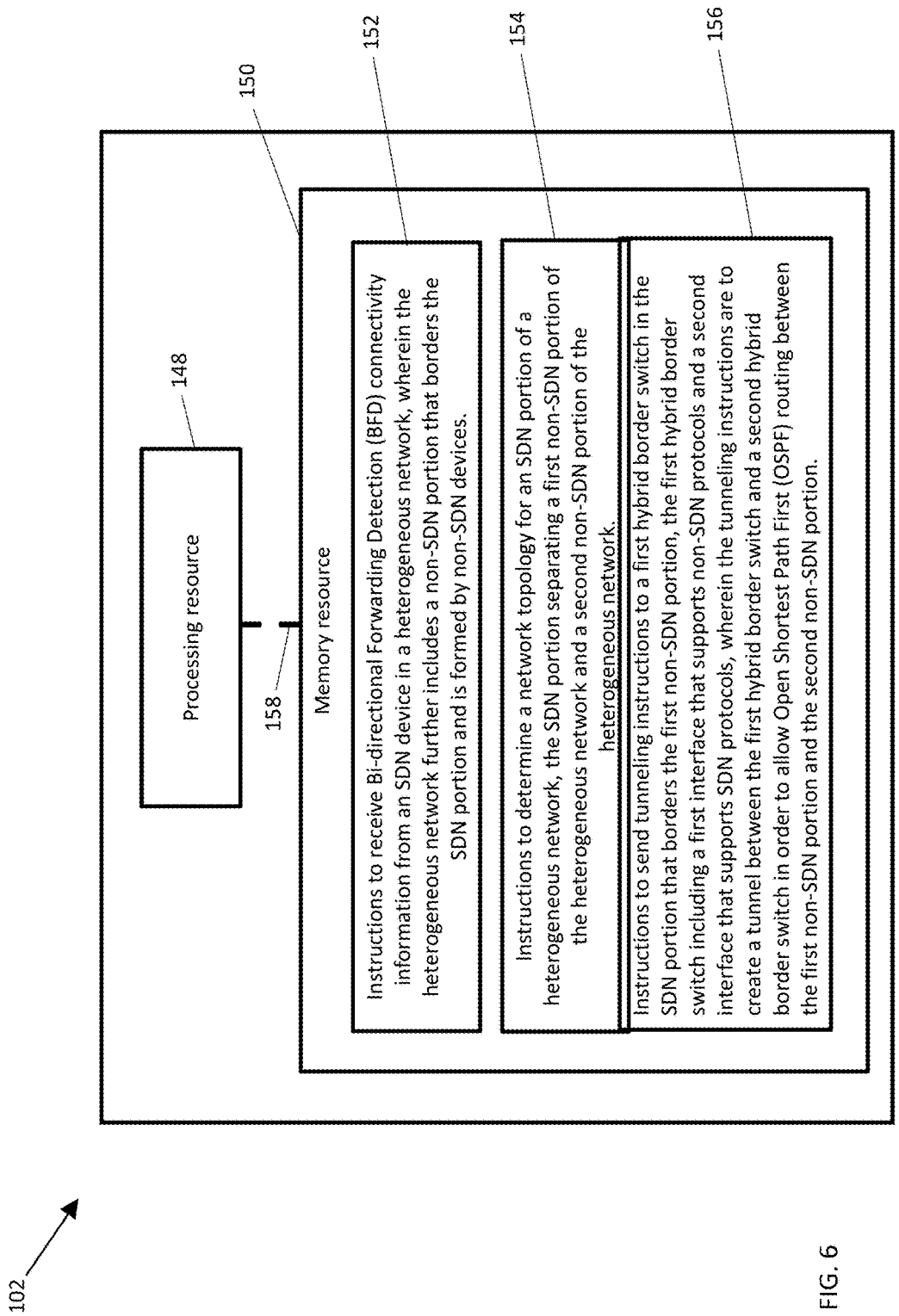
FIG. 6 is a diagram of an SDN controller, according to an example.

FIG. 6 is a diagram of one implementation of SDN controller 102. As described in further detail below, SDN controller 102 includes a processing resource 148 and a memory resource 150 that stores machine-readable instructions 152, 154, and 156. For illustration, the description of SDN controller 102 of FIG. 6 makes reference to various aspects of method 134 of FIGS. 2-5. Indeed, for consistency, the same reference number for the SDN controller of FIG. 1 is used for the SDN controller of FIG. 6. However it is appreciated that the SDN controller of FIG. 6 can include additional, alternative, or fewer aspects, functionality, etc., than the implementation described with respect to method 134 as well as the SDN controller of FIG. 1 and is not intended to be limited by the related disclosure thereof.

Instructions 152 stored on memory resource 150 are, when executed by processing resource 148, to cause processing resource 148 to receive BFD connectivity information from an SDN device in heterogeneous network 100. Instructions 152 can incorporate one or more aspects of blocks of method 134 or another suitable aspect of other implementations described herein (and vice versa).

Instructions 154 stored on memory resource 150 are, when executed by processing resource 148, to cause processing resource 148 to determine a network topology for an SDN portion of heterogeneous network 100. As provided herein, SDN portion 111 can, for example, separate a first non-SDN portion of heterogeneous network 100 and a second non-SDN portion of heterogeneous network 100. Instructions 154 can incorporate one or more aspects of blocks of method 134 or another suitable aspect of other implementations described herein (and vice versa).

Instructions 156 stored on memory resource 150 are, when executed by processing resource 148, to cause processing resource 148 to send tunneling instructions to a first hybrid border switch in SDN portion 111 that borders the first non-SDN portion. As provided above, the first hybrid border switch can, for example, include a first interface that supports non-SDN protocols and a second interface that supports SDN protocols. The tunneling instructions can, for example, create a tunnel between the first hybrid border switch and a second hybrid border switch in order to allow OSPF routing between the first non-SDN portion and the second non-SDN portion. Instructions 156 can incorporate one or more aspects of blocks of method 134 or another suitable aspect of other implementations described herein (and vice versa).

Processing resource 148 of SDN controller 102 can, for example, be in the form of a central processing unit (CPU), a semiconductor-based microprocessor, a digital signal processor (DSP) such as a digital image processing unit, other hardware devices or processing elements suitable to retrieve and execute instructions stored in memory resource 150, or suitable combinations thereof. Processing resource 148 can, for example, include single or multiple cores on a chip, multiple cores across multiple chips, multiple cores across multiple devices, or suitable combinations thereof. Processing resource 148 can be functional to fetch, decode, and execute instructions as described herein. As an alternative or in addition to retrieving and executing instructions, processing resource 148 can, for example, include at least one integrated circuit (IC), other control logic, other electronic circuits, or suitable combination thereof that include a number of electronic components for performing the functionality of instructions stored on memory resource 150. The term "logic" can, in some implementations, be an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Processing resource 148 can, for example, be implemented across multiple processing units and instructions may be implemented by different processing units in different areas of SDN controller 102.

Memory resource 150 of SDN controller 102 can, for example, be in the form of a non-transitory machine-readable storage medium, such as a suitable electronic, magnetic, optical, or other physical storage apparatus to contain or store information such as machine-readable instructions 152, 154, and 156. Such instructions can be operative to perform one or more functions described herein, such as those described herein with respect to method 134 or other methods described herein. Memory resource 150 can, for example, be housed within the same housing as processing resource 148 for SDN controller 102, such as within a computing tower case for SDN controller 102. In some implementations, memory resource 150 and processing resource 148 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory resource 150 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

Processing resource 148 and memory resource 150 can, for example, be in communication via a communication link 158. Each communication link 158 can be local or remote to a machine (e.g., a computing device) associated with processing resource 148. Examples of a local communication link 158 can include an electronic bus internal to a machine (e.g., a computing device) where memory resource 150 is one of volatile, nonvolatile, fixed, and/or removable storage medium in communication with processing resource 148 via the electronic bus.

In some implementations, one or more aspects of SDN controller 102 can be in the form of functional modules that can, for example, be operative to execute one or more processes of instructions 152, 154, or 156 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of SDN controller 102 can, for example, include one or more machine-readable storage mediums and one or more computer processors.

In view of the above, it is appreciated that the various instructions of SDN controller 102 described above can correspond to separate and/or combined functional modules. For example, instructions 152 can correspond to an "connectivity information receiving module" to receive BFD connectivity information from an SDN device in a heterogeneous network; instructions 154 can correspond to a "topology determination module" (see, e.g., module 104 of FIG. 1) to determine a network topology for an SDN portion of a heterogeneous network; and instructions 156 can correspond to a "tunneling instructions module" (see, e.g., module 106 of FIG. 1) to send tunneling instructions to a first hybrid border switch (e.g., switch 116) in SDN portion 111 that borders the first non-SDN portion. It is further appreciated that a given module can be used for multiple functions. As but one example, in some implementations, a single module can be used to both receive connectivity information (corresponding to aspects of instructions 152) as well as to determine the network topology (corresponding to aspects of instructions 154).

One or more nodes within heterogeneous network 100 (e.g., SDN controller 102) can further include a suitable communication module to allow networked communication between SDN controller 102 and other elements of heterogeneous network 100. Such a communication module can, for example, include a network interface controller having an Ethernet port and/or a Fibre Channel port. In some implementations, such a communication module can include wired or wireless communication interface, and can, in some implementations, provide for virtual network ports. In some implementations, such a communication module includes hardware in the form of a hard drive, related firmware, and other software for allowing the hard drive to operatively communicate with other hardware of SDN controller 102 or other network equipment. The communication module can, for example, include machine-readable instructions for use with communication the communication module, such as firmware for implementing physical or virtual network ports.

Figure 7:
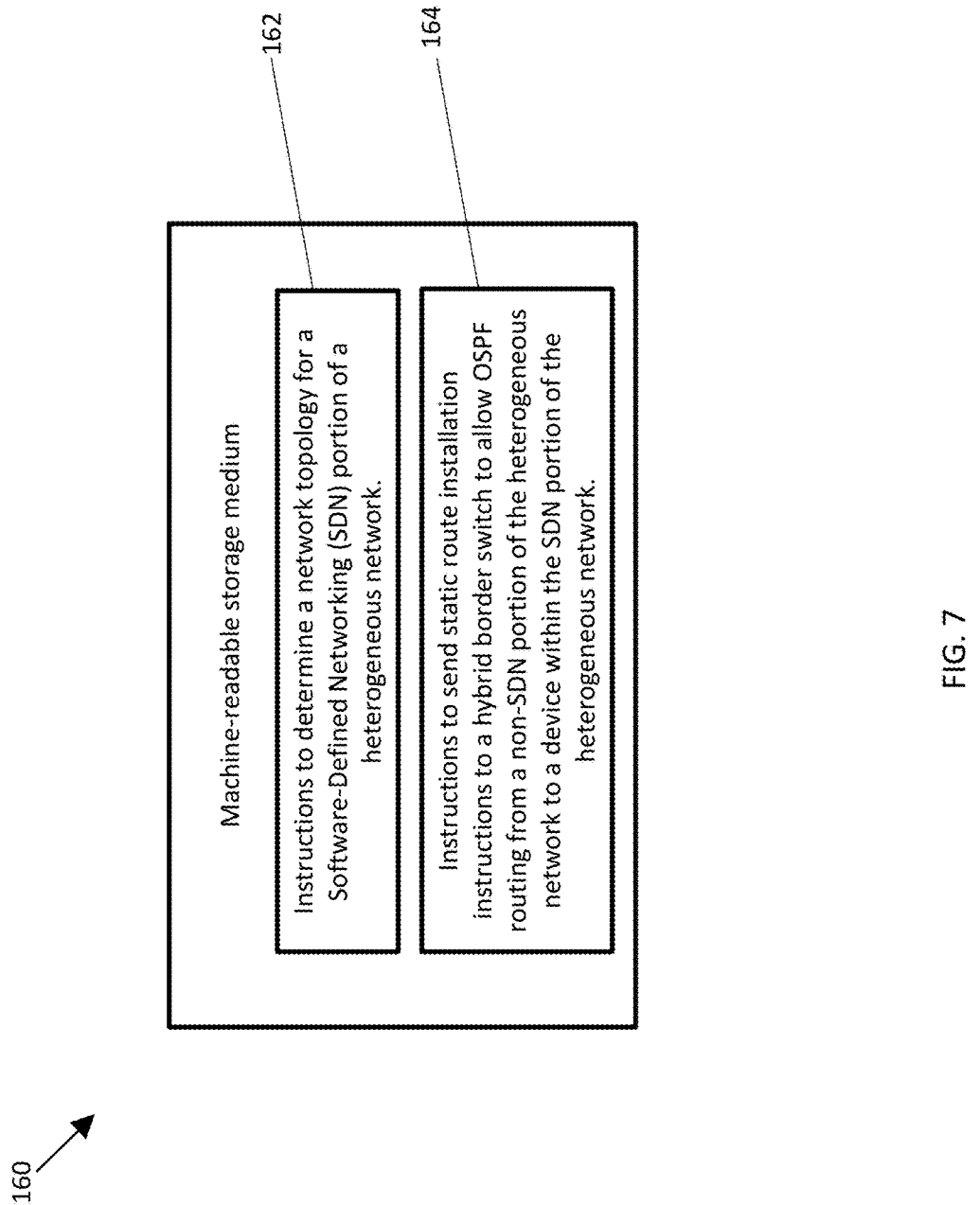
FIG. 7 is a diagram of machine-readable storage medium, according to an example.

FIG. 7 illustrates a machine-readable storage medium 160 including various instructions that can be executed by a computer processor or other processing resource. In some implementations, medium 160 can be housed within a physical SDN controller, such as certain implementations of SDN controller 102, or on another computing device within heterogeneous network 100 or in local or remote wired or wireless data communication with heterogeneous network 100.

For illustration, the description of machine-readable storage medium 160 provided herein makes reference to various aspects of SDN controller 102 (e.g., processing resource 148) and other implementations of the disclosure (e.g., method 134). Although one or more aspects of SDN controller 102 (as well as certain instructions, such as instructions 152, 154, and 156) can be applied or otherwise incorporated with medium 160, it is appreciated that in some implementations, medium 160 may be stored or housed separately from such a system. For example, in some implementations, medium 160 can be in the form of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, medium 160 is a physical medium housed within a physical chassis of an SDN controller, such as certain implementations of SDN controller 102.

Medium 160 includes machine-readable instructions 162 stored thereon to cause processing resource 148 to determine a network topology for an SDN portion of heterogeneous network 100. Instructions 162 can, for example, incorporate one or more aspects of block 136 of method 134 or instructions 154 of SDN controller 102 or another suitable aspect of other implementations described herein (and vice versa).

Medium 160 includes machine-readable instructions 164 stored thereon to cause processing resource 148 to send static route installation instructions to a hybrid border switch to allow OSPF routing from a non-SDN portion of heterogeneous network 100 to a device within SDN portion 111 of heterogeneous network 100. Instructions 164 can, for example, incorporate one or more aspects of block 138 of method 134 or another suitable aspect of other implementations described herein (and vice versa).

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

What is claimed is:

1. A method comprising:
   determining, with a Software-Defined Networking (SDN) controller, a network topology for an SDN portion of a heterogeneous network, wherein SDN portion is formed by hybrid and SDN devices, and wherein the heterogeneous network includes a non-SDN portion that borders SDN portion and is formed by non-SDN devices; and
   sending tunneling instructions to a first hybrid border switch to create a tunnel between the first hybrid border switch and a second hybrid border switch in order to allow Open Shortest Path First (OSPF) routing between two non-SDN portions separated by an SDN portion within the heterogeneous network.

2. The method of claim 1, further comprising:
   sending static route installation instructions to the first hybrid border switch to allow OSPF routing from the non-SDN portion to SDN portion.

3. The method of claim 2, wherein the static route installation instructions are to allow devices in the non-SDN portion to reach a subnet within SDN portion.

4. The method of claim 1, wherein the network topology is determined based on Bi-directional Forwarding Detection (BFD) connectivity information received from SDN devices in the heterogeneous network.

5. The method of claim 1, wherein the first hybrid border switch supports protocols for both SDN and non-SDN devices.

6. The method of claim 1, wherein the hybrid and SDN devices are within the control domain of the SDN controller.

7. The method of claim 1, further comprising:
   receiving, from a hybrid border switch, route information determined by the hybrid border switch from OSPF routing.

8. The method of claim 1, wherein the two non-SDN portions are separated by an SDN portion because SDN portion communicatively bridges the two non-SDN portions.

9. The method of claim 1, further comprising:
   determining, with the SDN controller, a flow entry for the hybrid border switch to handle packet routing from the non-SDN portion to SDN portion; and
   installing the determined flow entry on the hybrid border switch.

10. The method of claim 1, wherein the SDN controller sends tunneling instructions to every hybrid border switch in SDN portion to create tunnels between each of the hybrid border switches in order to allow OSPF routing between any two hybrid border switches.

11. The method of claim 1, wherein the heterogeneous network is a virtualized heterogeneous network.

12. A non-transitory machine readable storage medium having stored thereon machine readable instructions to cause a computer processor to:
   determine a network topology for a Software-Defined Networking (SDN) portion of a heterogeneous network, wherein the SDN portion is formed by hybrid and SDN devices, and wherein the heterogeneous network includes a non-SDN portion that borders SDN portion and is formed by non-SDN devices; and send tunneling instructions to a first hybrid border switch to create a tunnel between the first hybrid border switch and a second hybrid border switch in order to allow Open Shortest Path First (OSPF) routing between two non-SDN portions separated by an SDN portion within the heterogeneous network.

13. The medium of claim 12, wherein the medium is a physical medium housed within a physical SDN controller chassis.

14. A Software-Defined Networking (SDN) controller comprising:

a processing resource; and a memory resource storing machine readable instructions to cause the processing resource to:

receive Bi-directional Forwarding Detection (BFD) connectivity information from an SDN device in a heterogeneous network, wherein the heterogeneous network further includes a non-SDN portion that borders SDN portion and is formed by non-SDN devices;

determine a network topology for an SDN portion of a heterogeneous network, SDN portion separating a first non-SDN portion of the heterogeneous network and a second non-SDN portion of the heterogeneous network; and send tunneling instructions to a first hybrid border switch in SDN portion that borders the first non-SDN portion, the first hybrid border switch including a first interface that supports non-SDN protocols and a second interface that supports SDN protocols, wherein the tunneling instructions are to create a tunnel between the first hybrid border switch and a second hybrid border switch in order to allow Open Shortest Path First (OSPF) routing between the first non-SDN portion and the second non-SDN portion.

15. The SDN controller of claim 14, wherein the memory resource further stores machine readable instructions to cause the processing resource to:

send static route installation instructions to the first hybrid border switch, wherein the static routes are determined by the SDN controller to handle forwarding of packets between the non-SDN portion to SDN portion.

* * * * *